(12) United States Patent
Discekici et al.

(10) Patent No.: US 11,760,012 B2
(45) Date of Patent: Sep. 19, 2023

(54) THREE-DIMENSIONAL PRINTING WITH CARBAMIDE-CONTAINING COMPOUND

(71) Applicant: HEWLETT-PACKARD DEVELOPMENT COMPANY, L.P., Spring, TX (US)

(72) Inventors: Emre Hiro Discekici, San Diego, CA (US); Shannon Reuben Woodruff, San Diego, CA (US); Greg Scott Long, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/758,158

(22) PCT Filed: Jan. 29, 2020

(86) PCT No.: PCT/US2020/015559
§ 371 (c)(1),
(2) Date: Jun. 29, 2022

(87) PCT Pub. No.: WO2021/154227
PCT Pub. Date: Aug. 5, 2021

(65) Prior Publication Data
US 2023/0035064 A1    Feb. 2, 2023

(51) Int. Cl.
*B29C 64/165*    (2017.01)
*B33Y 10/00*    (2015.01)
(Continued)

(52) U.S. Cl.
CPC ............ *B29C 64/165* (2017.08); *B33Y 10/00* (2014.12); *B33Y 70/10* (2020.01); *B29K 2075/00* (2013.01);
(Continued)

(58) Field of Classification Search
CPC ..... B29C 64/165; B29C 64/153; B33Y 10/00; B33Y 30/00; B33Y 70/00; B33Y 70/10
See application file for complete search history.

(56) References Cited

U.S. PATENT DOCUMENTS

| | | |
|---|---|---|
| 2016/0280875 A1 | 9/2016 | Manitiu et al. |
| 2018/0104894 A1 | 4/2018 | Fung et al. |

FOREIGN PATENT DOCUMENTS

| | | |
|---|---|---|
| CN | 103756236 A | 4/2014 |
| CN | 109206892 A | 1/2019 |

(Continued)

OTHER PUBLICATIONS

Rigotti, D., et al., "3D printable thermoplastic polyurethane blends with thermal energy storage/release capabilities," Materials Today Communications, vol. 15, 2018, pp. 228-235.

*Primary Examiner* — Mary Lynn F Theisen
(74) *Attorney, Agent, or Firm* — HP Inc. Patent Department

(57) ABSTRACT

A three-dimensional printing kit can include a polymeric build material and a fusing agent. The polymeric build material can include polymer particles having a D50 particle size from about 2 μm to about 150 μm. The fusing agent can include an aqueous liquid vehicle including water and an organic co-solvent, a radiation absorber to generate heat from absorbed electromagnetic radiation, and from about 2 wt % to about 15 wt % of a carbamide-containing compound.

19 Claims, 2 Drawing Sheets

(51) Int. Cl.
    *B33Y 70/10*     (2020.01)
    *B29K 75/00*     (2006.01)
    *B29K 77/00*     (2006.01)
    *B29K 475/00*     (2006.01)
    *B29K 507/04*     (2006.01)

(52) U.S. Cl.
    CPC ...... *B29K 2077/00* (2013.01); *B29K 2475/02* (2013.01); *B29K 2507/04* (2013.01)

(56) References Cited

FOREIGN PATENT DOCUMENTS

| EP | 2001656 B1 | 10/2014 | |
|----|------------|---------|----|
| WO | WO-2017188965 A1 * | 11/2017 | ........... B29C 64/165 |
| WO | WO-2017196321 A1 * | 11/2017 | ........... B29C 64/165 |
| WO | WO-2019177612 A1 * | 9/2019 | ........... B29C 64/165 |
| WO | 2019/213732 A1 | 11/2019 | |

* cited by examiner

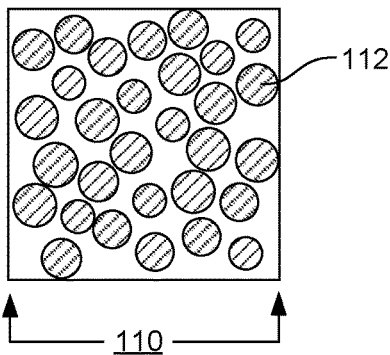

FIG. 1A

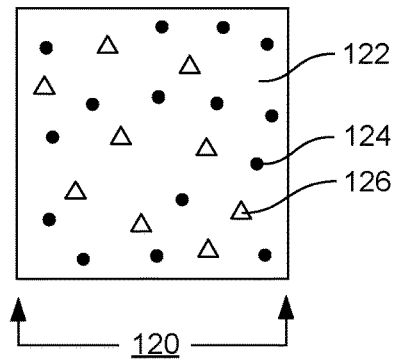

FIG. 1B

200 iteratively applying individual polymeric build material layers including polymer particles having a D50 particle size from about 2 μm to about 150 μm — 210 based on a three-dimensional object model, iteratively and selectively dispensing a fusing agent onto individual build material layers, wherein the fusing agent comprises an aqueous liquid vehicle including water and an organic co-solvent, a radiation absorber to generate heat from absorbed electromagnetic radiation, and from about 2 wt% to about 15 wt% of a carbamide-containing compound — 220 iteratively exposing the individual polymeric build material layers with the fusing agent dispensed therewith to electromagnetic radiation to selectively fuse polymer particles of the polymeric build material in contact with the radiation absorber and to form a fused three-dimensional object — 230

FIG. 2

THREE-DIMENSIONAL PRINTING WITH CARBAMIDE-CONTAINING COMPOUND

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques can be considered additive processes because they involve the application of successive layers of material. This can be unlike other machining processes, which often rely upon the removal of material to create the final part.

BRIEF DESCRIPTION OF THE DRAWINGS

FIG. 1A and FIG. 1B collectively provide a schematic illustration of an example three-dimensional printing kit in accordance with the present disclosure;

FIG. 2 is a flow diagram illustrating an example method of printing a three-dimensional object in accordance with the present disclosure.

DETAILED DESCRIPTION

Figure 3:
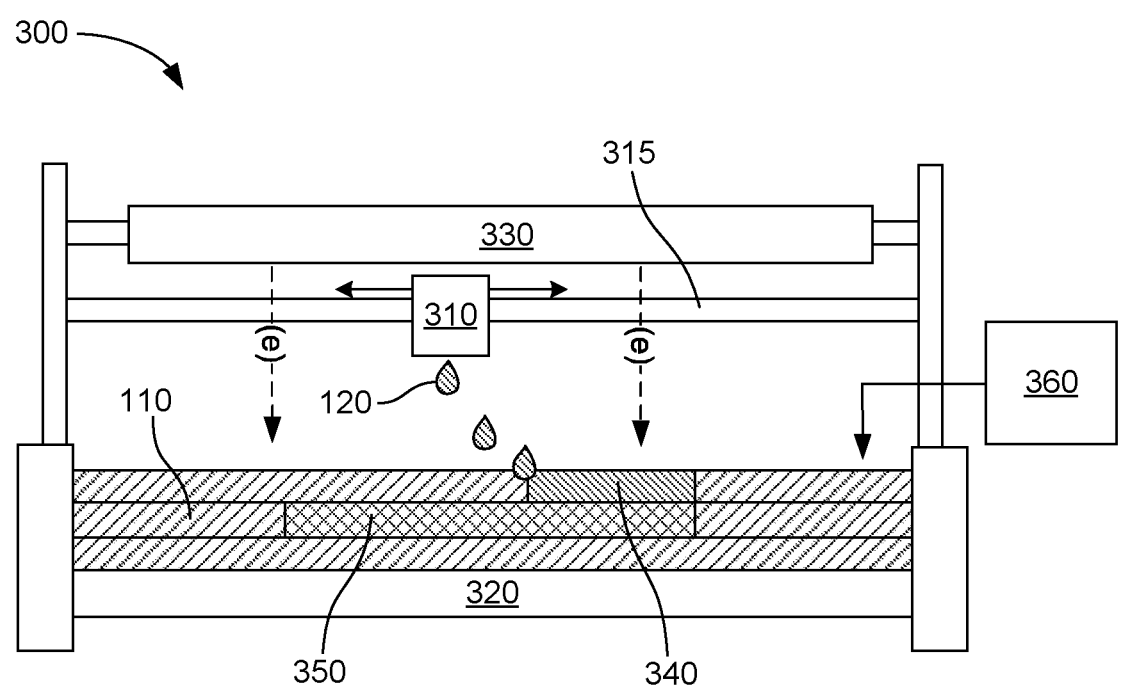
FIG. 3 is a schematic illustration of an example three-dimensional printing system in accordance with the present disclosure.

Three-dimensional printing can be an additive process involving the application of successive layers of a polymeric build material with a fusing agent printed thereon to bind the successive layers of the polymeric build material together. More specifically, a fusing agent, including a carbamide-containing compound, can be selectively applied to a layer of a polymeric build material on a support bed, e.g., a build platform supporting polymeric build material, to pattern a selected region of a layer of the polymeric build material. The layer of the polymeric build material can be exposed to electromagnetic radiation, and due to the presence of the radiation absorber on the printed portions, absorbed light energy at those portions of the layer having the fusing agent printed thereon can be converted to thermal energy, causing that portion to melt or coalesce, while other portions of the polymeric build material do reach temperatures suitable to melt or coalesce. This can then be repeated on a layer-by-layer basis until the three-dimensional object is formed. The presence of the carbamide compound in the fusing agent can provide some softening of the three-dimensional object formed therefrom.

In accordance with this, a three-dimensional printing kit (or "kit") can include a polymeric build material including polymer particles having a D50 particle size from about 2 µm to about 150 µm, and a fusing agent. The fusing agent can include an aqueous liquid vehicle including water and an organic co-solvent, a radiation absorber to generate heat from absorbed electromagnetic radiation, and from about 2 wt % to about 15 wt % of a carbamide-containing compound. In one example, the carbamide-containing compound can include urea or a bi-urea and is present in the fusing agent at from about 4 wt % to about 12 wt %. In another example, the radiation absorber can include carbon black, a metal dithiolene complex, a near-infrared absorbing dye, a near-infrared absorbing pigment, metal nanoparticles, a conjugated polymer, or a combination thereof. The radiation absorber can be present in the fusing agent at from about 0.1 wt % to about 10 wt %, for example. The aqueous liquid vehicle can further include from about 0.01 wt % to about 2 wt % surfactant in some examples. The polymeric build material can include polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or a copolymer thereof. In one more specific example, the radiation absorber can be carbon black and the polymer particles can include a thermoplastic polyurethane or a thermoplastic polyamide. In another example, a detailing agent can be included as part of the kit. The detailing agent can include a detailing compound to reduce a temperature of the polymeric build material onto which the detailing agent is applied.

In another example, a method of printing a three-dimensional object can include iteratively applying individual polymeric build material layers including polymer particles having a D50 particle size from about 2 µm to about 150 µm, and based on a three-dimensional object model, iteratively and selectively dispensing a fusing agent onto individual build material layers. The fusing agent can include an aqueous liquid vehicle including water and an organic co-solvent, a radiation absorber to generate heat from absorbed electromagnetic radiation, and from about 2 wt % to about 15 wt % of a carbamide-containing compound. The method can further include iteratively exposing the individual polymeric build material layers with the fusing agent dispensed therewith to electromagnetic radiation to selectively fuse polymer particles of the polymeric build material in contact with the radiation absorber and to form a fused three-dimensional object. In one example, the radiation absorber can include carbon black and the polymer particles can include a thermoplastic polyurethane or a thermoplastic polyamide. In another example, the carbamide-containing compound can include urea or a bi-urea and can be applied to the particulate build material layer at a carbamide-containing compound to polymer particles weight ratio from about 1:50 to about 1:500. In further detail, the method can include selectively jetting a detailing agent including a detailing compound onto the individual build material layers, wherein the detailing compound reduces the temperature of build material onto which the detailing agent is applied.

In another example, a three-dimensional printing system can include a polymeric build material with polymer particles having a D50 particle size from about 2 µm to about 150 µm, and can further include a fluid applicator fluidly coupled or coupleable to a fusing agent. The fluid applicator can be directable to iteratively apply the fusing agent to layers of the polymeric build material. The fusing agent can include an aqueous liquid vehicle including water and an organic co-solvent, a radiation absorber to generate heat from absorbed electromagnetic radiation, and from about 2 wt % to about 15 wt % of a carbamide-containing compound. In one example, an electromagnetic radiation source can be included that is positioned to provide electromagnetic radiation to the layers of the polymeric build material having the fusing agent applied thereto. The radiation absorber can selectively absorb infrared energy and can be an infrared electromagnetic radiation source that emits a peak wavelength that corresponds with the infrared energy.

When discussing the three-dimensional printing kit, method of printing a three-dimensional object, and/or the three-dimensional printing system herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the method of printing a three-dimensional object, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

A three-dimensional printing kit is shown by way of example in FIGS. 1A and 1B. The three-dimensional printing kit can include, for example, a polymeric build material 110, shown in FIG. 1A, and a fusing agent 120, shown in FIG. 1B. The polymeric build material can include polymer particles 112 can have a D50 particle size from about 2 μm to about 150 μm, for example. The fusing agent can include an aqueous liquid vehicle 122 including water and an organic co-solvent, a radiation absorber 124 to generate heat from absorbed electromagnetic radiation, and from about 2 wt % to about 15 wt % of a carbamide-containing compound 126.

In some examples, the three-dimensional printing kit can further include other fluids, such as coloring agents, detailing agents, or the like. A detailing agent, for example, can include a detailing compound, which can be a compound that can reduce the temperature of the polymeric build material when applied thereto. In some examples, the detailing agent can be applied around edges of the application area of the fusing agent. This can prevent caking around the edges due to heat from the area where the fusing agent was applied. The detailing agent can also be applied in the same area where the fusing agent was applied in order to control the temperature and prevent excessively high temperatures when the polymeric build material is fused.

The polymeric build material may be packaged or co-packaged with the fusing agent, coloring agent, detailing agent, or the like in separate containers, and/or can be combined with the fusing agent at the time of printing, e.g., loaded together in a three-dimensional printing system. Example polymeric build materials that can be used include polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or a copolymer thereof. In some more specific examples, the polymeric build material can be a thermoplastic polymeric material, such as a thermoplastic polyamide, or a polyurethane, such as thermoplastic polyurethane.

Methods of Printing Three-dimensional Objects

A flow diagram of an example method 200 of three-dimensional (3D) printing is shown in FIG. 2. The method can include iteratively applying 210 individual polymeric build material layers including polymer particles having a D50 particle size from about 2 μm to about 150 μm, and based on a three-dimensional object model, iteratively and selectively dispensing 220 a fusing agent onto individual build material layers. The fusing agent can include an aqueous liquid vehicle including water and an organic co-solvent, a radiation absorber to generate heat from absorbed electromagnetic radiation, and from about 2 wt % to about 15 wt % of a carbamide-containing compound. The method can further include iteratively exposing 230 the individual polymeric build material layers with the fusing agent dispensed therewith to electromagnetic radiation to selectively fuse polymer particles of the polymeric build material in contact with the radiation absorber and to form a fused three-dimensional object. In one example, the radiation absorber can include carbon black and the polymer particles can include a thermoplastic polyurethane or a thermoplastic polyamide. In another example, the carbamide-containing compound can include urea or a bi-urea and can be applied to the particulate build material layer at a carbamide-containing compound to polymer particles weight ratio from about 1:50 to about 1:500. In further detail, the method can include selectively jetting a detailing agent including a detailing compound onto the individual build material layers, wherein the detailing compound reduces the temperature of the build material onto which the detailing agent is applied.

In printing in a layer-by-layer manner, the polymeric build material can be spread, the fusing agent applied, the layer of the polymeric build material can be exposed to energy, and then a build platform between the polymeric bed material and the fusing agent application can be adjusted to accommodate the printing of another layer, e.g., about 5 μm to about 1 mm, which can correspond to the thickness of a printed layer of the three-dimensional object. Thus, another layer of the polymeric build material can be added again thereon to receive another application of fusing agent, and so forth. During the build, the radiation absorber in the fusing agent can act to convert the energy to thermal energy and promote the transfer of thermal heat to polymer particles of the polymeric build material in contact with the fusing agent including the radiation absorber. In an example, the fusing agent can elevate the temperature of the polymer particles of the polymeric build material above the melting or softening point of the polymer particles, thereby allowing fusing (e.g., sintering, binding, curing, etc.) of the polymeric build material (or polymer particles thereof) and the formation of an individual layer of the three-dimensional object. The method can be repeated until all the individual polymeric build material layers have been created and a three-dimensional object is formed. In some examples, the method can further include heating the polymeric build material prior to dispensing.

In one example, the method can further include, iteratively and selectively dispensing a detailing agent onto individual polymeric build material layers laterally at a border between a first area where the individual polymeric build material layer was contacted by the fusing agent and a second area where the individual polymeric build material layer was not contacted by the fusing agent. This can prevent caking around the edges due to heat from the area where the fusing agent was applied. The detailing agent can also be applied in the same area where the fusing agent was applied in order to control the temperature and prevent excessively high temperatures when the polymeric build material is fused.

In another example, the three-dimensional object formed from the method can be softened (compared to three-dimensional objects printed with the same fusing agent, but without the polymer-softening fusing compound), or can be adjusted with respect to tensile strength, for example. Specifically, three-dimensional objects can be subject to tensile strength and elongation at break issues which can result in failure due to brittleness. The use of the fusing agents described herein can provide a way of reducing the hardness of the three-dimensional object, and in some cases, increase the tensile strength as well, particularly with different types of thermoplastic polymeric build materials, e.g., thermoplastic polyurethanes and/or thermoplastic polyamides. In some examples, a three-dimensional printed object produced using the methods described herein can have a tensile strength from about 50 MPa to about 100 MPa, from about 55 MPa to about 90 MPa, or from about 60 MPa to about 85 MPa. In further examples, the three-dimensional printed object can exhibit a shore hardness (Shore A, or SHA), which is a measure of a material's resistance to indentation, strength from about 60 SHA to about 95 SHA, from about 70 SHA to about 90 SHA, or from about 75 SHA to about 90 SHA, for example. These tensile strength and Shore hardness values can be polymeric build material dependent. However, a reduction in Shore hardness compared to the use of fusing agents applied without the carbamide-containing compound but which is otherwise the same and applied the same can be realized with many materials, with Shore hardness value reductions of greater than about 1% to about 25%, about 5% to about 25%, and from about 10% to about 20%. In some particular examples, these properties can be achieved for three-dimensional printed objects prepared with any of a number of polymeric build materials, such as those previously described with respect to the three-dimensional printing kits.

Three-Dimensional Printing System

A three-dimensional printing system 300 in accordance with the present disclosure is illustrated schematically in FIG. 3. The three-dimensional printing system can include a polymeric build material 110 and a fluid applicator 310. The polymeric build material can include polymer particles that have a D50 particle size of from about 2 μm to about 150 μm and can be any of a number of polymeric build materials, such as those previously described with respect to the three-dimensional printing kits. The fluid applicator can be coupled or coupleable to a fusing agent 120. The fusing agent can include an aqueous liquid vehicle including water and an organic co-solvent, a radiation absorber to generate heat from absorbed electromagnetic radiation, and from about 2 wt % to about 15 wt % of a carbamide-containing compound.

In further detail, the fluid applicator 310 can be a digital fluid ejector, e.g., thermal or piezo jetting architecture. The fluid applicator, in an example, can be a fusing agent applicator that can be fluidly coupled or coupleable to the fusing agent 120 to iteratively apply the fusing agent to the polymeric build material 110 to form individually patterned object layers 340. The fluid applicator can be any type of apparatus capable of selectively dispensing or applying the fusing agent. For example, the fluid applicator can be a fluid ejector or digital fluid ejector, such as an inkjet printhead, e.g., a piezo-electric printhead, a thermal printhead, a continuous printhead, etc. The fluid applicator could likewise be a sprayer, a dropper, or other similar structure for applying the fusing agent to the polymeric build material. Thus, in some examples, the application can be by jetting or ejecting the fusing agent from a digital fluid jet applicator, similar to an inkjet pen.

In an example, the fluid applicator can be located on a carriage track 315, as shown in FIG. 3, but could be supported by any of a number of structures. In yet another example, the fluid applicator can include a motor (not shown) and can be operable to move back and forth, and the fluid applicator can also be moved front to back as well, to provide both x- and y-axis movement over the polymeric build material when positioned over or adjacent to a polymeric build material on a powder bed of a build platform.

In an example, the three-dimensional printing system can further include a build platform 320 to support the polymeric build material. The polymeric build material 110 can be spread onto the build platform or a previously applied powder bed of polymeric build material from a build material supply 360, and then in some instances flattened to make the applied layer more uniform in nature. The build platform can be positioned to permit application of the fusing agent from the fluid applicator onto a layer of the polymeric build material. The build platform can be configured to drop in height, thus allowing for successive layers of the polymeric build material to be applied by a supply and/or spreader. The polymeric build material can be layered in the build platform at a thickness that can range from about 5 μm to about 1 mm. In some examples, individual layers can have a relatively uniform thickness. In one example, a thickness of a layer of the polymeric build material can range from about 10 μm to about 500 μm or from about 30 μm to about 200 μm. Furthermore, heat can be applied to the build platform, or from any other direction or time, to bring the polymeric build material to a temperature near its fusing temperature, making it easier to bring up the temperature enough to generate fusion of the polymeric build material. For example, heat may be applied to the polymeric build material in the powder bed from the build platform, from above, or to the polymeric build material prior to being spread on the powder bed to preheat the polymeric build material within about 10° C. to about 70° C. of the fusing temperature of the polymer particles so that less energy may be applied to bring the polymer particles to their fusing temperature.

Following the selective application of a fusing agent to the polymeric build material, the polymeric build material can be exposed to energy (e) from an electromagnetic radiation source 330. The electromagnetic radiation source can be positioned to expose the individual layers of the polymeric build material to radiation energy to selectively fuse polymer particles of the polymeric build material in contact with the radiation absorber (forming fused layers 350) to iteratively form a three-dimensional object. The radiation source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In one example, the emitted electromagnetic radiation can have a wavelength that can range from about 400 nm to about 2 μm. In some examples, the radiation source can be operatively connected to a lamp/laser driver, an input/output temperature controller, and/or temperature sensors.

Polymeric Build Materials

The polymeric build material can be used as the bulk material of the three-dimensional printed object. As mentioned, the polymeric build material can include from about 80 wt % to 100 wt % polymer particles. In another example, the polymeric build material can include from about 85 wt % to about 95 wt %, from about 90 wt % to 100 wt %, or 100 wt % polymer particles.

In examples herein, as mentioned, the polymeric build material can include polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or a copolymer thereof. In another example, the polymeric build material can include thermoplastic polymeric build material, such as a thermoplastic polyamide and/or a thermoplastic polyurethane. The various polymers can have a variety of structures, including a variety of weight average molecular weights, D50 particle sizes, polydispersity of side-chain branching, etc.

The polymeric build material may include similarly sized polymer particles or differently sized polymer particles. The term "size" or "particle size," as used herein, refers to the diameter of a substantially spherical particle, or the effective diameter of a non-spherical particle, e.g., the diameter of a sphere with the same mass and density as the non-spherical particle as determined by weight. A substantially spherical particle, e.g., spherical or near-spherical, can have a sphericity of >0.84. Thus, any individual polymer particles having a sphericity of <0.84 can be considered non-spherical (irregularly shaped). For example, the polymer particles can have a D50 particle size from about 2 μm to about 150 μm, from about 25 μm to about 125 μm, from about 50 μm to about 150 μm, or from about 20 μm to about 80 μm. D50 particle sizes are based on the equivalent spherical volume of the polymer particles. D50 particle sizes can be measured by laser diffraction, microscope imaging, or other suitable methodology, but in some examples, the particle size (or particle size distribution) can be measured and/or characterized using a Malvern™ Mastersizer™. This tool considers particle sizes based on diameter of the equivalent spherical volume of the polymer particles when the polymer particles are not spherical, e.g., having about a 1:1 aspect ratio.

The polymeric build material can, in some examples, further include flow additives, antioxidants, inorganic filler, or any combination thereof. Typically, an amount of any of these or other similar components can be at about 5 wt % or less. Example flow additives can include fumed silica, and/or the like. Example antioxidants can include hindered phenols, phosphites, thioethers, hindered amines, and/or the like. Example inorganic fillers can include particles such as alumina, silica, glass beads, glass fibers, carbon nanotubes, cellulose, and/or the like. Some additives may be found in multiple categories of additives, e.g., fumed silica can be a flow additive as well as a filler. In some examples, the filler or other type of additive can become embedded or composited with the polymer particles.

The polymeric build material can be capable of being printed into three-dimensional objects with a resolution of about 10 μm to about 150 μm, about 20 μm to about 100 μm, or about 25 μm to about 80 μm. As used herein, "resolution" refers to the size of the smallest feature that can be formed on a three-dimensional object. The polymeric build material can form layers from about 10 μm to about 150 μm thick, depending on the size of polymer particles present in the polymeric build material, thus allowing the fused layers of the printed object to have about the same thickness or a few to many times (e.g., 2 to 20 times) thicker than the D50 particle size of the polymer particles, for example. This can provide a resolution in the z-axis direction (e.g., the direction of the buildup of layers) of about 10 μm to about 150 μm. In some examples, however, the polymeric build material can also have a sufficiently small particle size and sufficiently uniform particle shape to provide an x- and y-axis resolution about the size of the polymer particle size, e.g., about 2 μm to about 150 μm (e.g., the axes parallel to the support surface of the build platform).

Fusing Agents

In further detail, regarding the fusing agent 120 that may be utilized in the three-dimensional printing kits, methods of printing a three-dimensional object, or the three-dimensional printing systems, as described herein, the fusing agent can include an aqueous liquid vehicle, a radiation absorber to generate heat from absorbed electromagnetic radiation, and from about 1 wt % to about 15 wt % of a carbamide-containing compound. The aqueous liquid vehicle can include water and an organic co-solvent.

In further detail, the fusing agent can include a radiation absorber. An amount of radiation absorber in the fusing agent can vary depending on the type of radiation absorber. In some examples, an amount of radiation absorber in the fusing agent can be from about 0.1 wt % to about 10 wt %. In another example, the amount can be from about 0.5 wt % to about 7.5 wt %. In yet another example, the amount can be from about 1 wt % to about 10 wt %. In a particular example, the amount can be from about 0.5 wt % to about 5 wt %.

Example radiation absorbers can include carbon black, a metal dithiolene complex, a near-infrared absorbing dye, a near-infrared absorbing pigment, metal nanoparticles, a conjugated polymer, or a combination thereof. In an example, the radiation absorber can be carbon black. In some examples, the radiation absorber can be colored or colorless.

Examples of near-infrared absorbing dyes can include aminium dyes, tetraaryldiamine dyes, cyanine dyes, phthalocyanine dyes, dithiolene dyes, and others. A variety of near-infrared absorbing pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2. For example, $M_2P_2O_7$ can include compounds such as $Cu_2P_2O_7$, $Cu/MgP_2O_7$, $Cu/ZnP_2O_7$, or any other suitable combination of counterions. The phosphates described herein are not limited to counterions having a +2 oxidation state. Other phosphate counterions can also be used to prepare other suitable near-infrared pigments. Additional near-infrared absorbing pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. The silicates described herein are not limited to counterions having a +2 oxidation state. Other silicate counterions can also be used to prepare other suitable near-infrared pigments.

The carbamide-containing compound, in further detail, can be present in the fusing agent from about 2 wt % to about 15 wt %. In yet other examples, the carbamide-containing compound can be present at from about 4 wt % to about 12 wt %, or from about 5 wt % to about 10 wt %. In various examples consistent with the three-dimensional printing kit, the carbamide-containing compound can be defined as shown in Formula I, as follows:

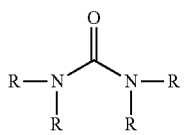

Formula I where R is independently H, NHC(O)NH$_2$, C(O)NH$_2$, C1-C4 lower alkyl, or the like. When all four (4) R groups are H, then the structure is urea. When one (1) of the R groups is NHC(O)NH$_2$ and the other three (3) R groups are H, then the structure is biurea. When one (1) of the R groups is C(O)NH$_2$ and the other three (3) R groups are H, then the structure is biuret. There are also other carbamide-containing compounds that can be used consistent with Formula I, such as other organo-substituted carbamides, for example.

Consistent with the fusing agent formulations of the present disclosure, modification thereof with the carbamide-containing compound as a "drop-in" solution for fusing can provide for "softer" (or reduced Shore hardness) three-dimensional objects, and in some cases, can provide for objects with more tensile strength or elasticity, particularly when used with thermoplastic polymeric build material. Thermoplastic polyurethane (TPU) provides an example of a thermoplastic material that can benefit from the hardness/softness modulation that may be available using carbamide-containing compounds as described herein, e.g., by adding a carbamide-containing compound to the fusing agent, additional softness and/or elasticity can be introduced to the material upon fusing to form a three-dimensional object. Thermoplastic polyamides provide another example class of materials that can be softenable via the addition of the carbamide-containing compound to the fusing agent. As a more specific example of a carbamide-containing compound that can be useful, urea and other similar compounds can be effective for this purpose. Urea is highly water-soluble, so it can be added to fusing agent formulations at relatively high concentrations, and thus, can be added in concentrations suitable to promote modification of printed object hardness when used in a fusing agent. In this example, and others, the urea can generate a gas at the temperatures typically used to fuse TPU and other thermoplastic polymeric build materials, and this gas generation can promote bubbles within the part, thus softening the part, and in some cases, modifying tensile strength as well. With urea as an example, the generation of the gas from urea at the fusing temperatures of TPU may often leave no residual byproducts, and the gases generated by the decomposition of urea can be essentially safe gases to release during the build of the three-dimensional object. For example, the decomposition of urea may include the generation of $CO_2$ gas, which is essentially safe to the surrounding environment at levels released.

The decomposition of the carbamide-containing compound to release a gas can depend on which carbamide-containing compound is selected for use. The decomposition temperature can be paired, for example, with the fusing temperature of the polymeric build material. For example, the fusing temperature to the polymeric build material can be from about 80° C. to about 300° C., from about 100° C. to about 250° C., or from about 110° C. to about 210° C. With these fusing temperatures in mind, a polymeric build material can be selected that has a fusing temperature that overlaps with a range of temperatures where gas is generated from the carbamide-containing compound. For example, urea decomposes at about 132.7° C., and depending on the time frame, can decompose at temperatures well above 132.7° C., provided it has not already decomposed at the lower temperatures. Notably, polymer particles of the polymeric build materials described herein can be selected that have a fusing temperature that occurs within about 50° C. of the decomposition temperature of the carbamide-containing compound. The "fusing temperature" of the polymeric build material, for example, can be from about 10° C. to about 70° C. or so below the melting temperature of the polymer particles of the polymeric build material. Thus, if urea is used in the fusing agent, then a thermoplastic polyurethane can be used that has a fusing temperature ranging from about 110° C. to about 160° C., or from about 120° C. to about 150° C., for example. These ranges are example ranges only and can be modified depending on the speed of application, the temperatures reached during fusion, the dwell time and/or intensity of application of energy, the radiation absorber selected for use, the contone level of fusing agent applied, etc. Furthermore, in addition to urea, other example carbamide-containing compounds with higher decomposition temperatures that can be used, include materials such as biurea, biuret, or the like, which tend to decompose with more prolonged heating times and/or temperatures compared to urea, e.g., from about 150° C. to about 210° C. In some instances, these and other materials may decompose first to urea, and then release the $CO_2$ gas during urea decomposition, for example, and these factors can be considered when selecting carbamide-containing compounds, formulating fusing agents, selecting polymeric build materials including polymer particles to include therein, etc.

In further detail, depending on how much fusing agent is used, various build layers or portions of individual build layers can be made to have different softness compared to other layers or other portions of individual layers, for example. Thus, custom stacks of layers within a part can be prepared with modulated or varying degrees of Shore hardness, tensile strength, and/or other mechanical properties. As an example, by reducing the Shore hardness of a three-dimensional object, or a portion of a three-dimensional object, the objects can be made to be potentially tougher with respect to breakage from stretching and/or shearing, even if they are lower in hardness.

When applying the fusing agent to the polymeric build material, the concentration of the carbamide-containing compound can be considered in conjunction with the concentration of the radiation absorber in the fusing agent. These concentrations can be used to determine how much fusing agent to apply to achieve a weight ratio of fusing agent to polymeric build material and weight ratio of carbamide-containing compound to polymeric build material to provide for acceptable layer-by-layer fusing and softening, respectively. For example, the fusing agent, as mentioned, can include from about 0.1 wt % to about 10 wt % radiation absorber in some examples, and can also include from about 2 wt % to about 15 wt % carbamide-containing compound. Thus, if applying the fusing agent (10 wt %) to the polymeric build material (90 wt %) at about a 1:9 weight ratio, then the radiation absorber to polymeric build material weight ratio (as applied) can be from about 1:10000 to about 1:100, and the carbamide-containing compound to polymeric build material weight ratio (as applied) can be from about 1:500 to about 1:50, for example. If more (up to 20 wt %) or less (down to 5 wt %) fusing agent is applied to the polymeric build material, then these ratios can be expanded accordingly. With that as a reference, the weight ratio of the radiation absorber to the polymeric build material (as applied) may more typically be from about 1:1000 to about 1:80, and the weight ratio of the carbamide-containing compound to polymeric build material (as applied) may more typically be from about 1:500 to about 1:60, for example.

In some examples, in addition to the radiation absorber and the carbamide-containing compound, there may be other components or dispersed additives carried by the aqueous liquid vehicle. In some examples, the aqueous liquid vehicle can further include from about 0.01 wt % to about 2 wt % or from about 0.01 wt % to about 0.5 wt % surfactant. In other examples, the fusing agent can further include a dispersant. Dispersants can help disperse the radiation absorber, the carbamide-containing compound (if not solubilized fully), other dispersed additives, or a combination thereof. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof. Other additives may be present as part of the aqueous liquid vehicle, as described more fully below.

Detailing Agent

In some examples, the three-dimensional printing kits, methods of printing a three-dimensional object, and/or three-dimensional printing systems can further include a detailing agent and/or the application thereof. A detailing agent can include a detailing compound capable of cooling the polymeric build material upon application. In some examples, the detailing agent can be printed around the edges of the portion of a polymeric build material that is or can be printed with the fusing agent. The detailing agent can increase selectivity between the fused and un-fused portions of the polymeric build material by reducing the temperature of the polymeric build material around the edge of the portion to be fused. In other examples, the detailing agent can be printed in areas where the fusing agent is printed to provide additional cooling when printing a three-dimensional object.

In some examples, the detailing agent can be a solvent that can evaporate at the temperature of the particulate build material supported on the powder bed or build platform. As mentioned above, in some cases, the polymeric build material in the powder bed can be preheated to a preheat temperature within about 10° C. to about 70° C. of the fusing temperature of the polymeric build material. Thus, the detailing agent can be a solvent that evaporates upon contact with the polymeric build material at the preheat temperature, thereby cooling the printed portion through evaporative cooling. In certain examples, the detailing agent can include water, co-solvents, or combinations thereof. In further examples, the detailing agent can be substantially devoid of radiation absorbers. That is, in some examples, the detailing agent can be substantially devoid of ingredients that absorb enough energy from the energy source to cause the polymeric build material to fuse. In certain examples, the detailing agent can include colorants such as dyes or pigments, but in small enough amounts such that the colorants do not cause the polymeric build material printed with the detailing agent to fuse when exposed to the energy source.

Aqueous Liquid Vehicle

As used herein, the term "aqueous liquid vehicle" may refer to the liquid in the fusing agent, the detailing agent, and/or other fluid agents that may be present, e.g., coloring agent. The aqueous liquid vehicle may include water alone or in combination with a variety of additional components. With respect to the fusing agent, the aqueous liquid vehicle includes water and organic co-solvent, but with respect to the detailing agent, the aqueous liquid vehicle may be water, or may include water and organic co-solvent, for example. Examples of components that may be included, in addition to water, may include organic co-solvent, surfactant, buffer, antimicrobial agent, anti-kogation agent, chelating agent, buffer, etc. In an example, the aqueous liquid vehicle can include water and organic co-solvent. In another example, the aqueous liquid vehicle can include water, organic co-solvent, and a surfactant. In yet another example, the aqueous liquid vehicle can include water, organic co-solvent, surfactant, and buffer (or buffer and a chelating agent).

In examples herein, the aqueous liquid vehicle for the fusing agent, the detailing agent, or any other fluid agent included in the kits, methods, and/or systems herein, can include from about 25 wt % to about 90 wt % or from about 30 wt % to about 75 wt % water, and from about from about 5 wt % to about 60 wt % or from about 10 wt % to about 50 wt % organic co-solvent. These weight percentages are based on the fluid agent as a whole, and not just the liquid vehicle component. Thus, the liquid vehicle can include water that may be deionized, for example. In an example, the aqueous liquid vehicle can include organic-solvent to water at a ratio from about 2:1 to about 1:2, from about 1:1 to about 1:2, from about 1:1 to about 1:1.5 or from about 1:1 to about 1:1.25. In some examples, such as with respect to the detailing agent, the aqueous liquid vehicle may carry no solids, may be simply water, or may include as major components a combination of water and organic co-solvent.

The liquid vehicle in any of these fluid agents may include organic co-solvent(s). Some examples of co-solvent that may be added to the vehicle include 1-(2-hydroxyethyl)-2-pyrrolidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), or a combination thereof. In one example, the co-solvent can include 2-pyrrolidinone. Whether a single co-solvent is used or a combination of co-solvents is used, the total amount of co-solvent(s) in the fusing agent, the detailing agent, or other fluid agent can be from about 5 wt % to about 60 wt %, from about 10 wt % to about 50 wt %, from about 15 wt % to about 45 wt %, or from about 30 wt % to about 50 wt % based on a total weight percentage of the fusing agent or the total weight percentage of the detailing agent.

The aqueous liquid vehicle may also include surfactant. The surfactant can include non-ionic surfactant, cationic surfactant, and/or anionic surfactant. In one example, the fusing agent includes an anionic surfactant. In another example, the fusing agent includes a non-ionic surfactant. In still another example, the fusing agent includes a blend of both anionic and non-ionic surfactant. Example non-ionic surfactant that can be used includes self-emulsifiable, non-ionic wetting agent based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Still other surfactants can include wetting agents and molecular defoamers (e.g., SURFY- NOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactant can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK). Example cationic surfactant that can be used includes dodecyltrimethylammonium chloride, hexadecyldimethylammonium chloride, or a combination thereof. In some examples, the surfactant (which may be a blend of multiple surfactants) may be present in the fusing agent, the detailing agent, or other fluid agent at an amount ranging from about 0.01 wt % to about 2 wt %, from about 0.05 wt % to about 1.5 wt %, or from about 0.01 wt % to about 1 wt %.

In some examples, the liquid vehicle may also include a chelating agent, an antimicrobial agent, a buffer, or a combination thereof. While the amount of these may vary, if present, these can be present in the fusing agent, the detailing agent, or other fluid agent at an amount ranging from about 0.001 wt % to about 20 wt %, from about 0.05 wt % to about 10 wt %, or from about 0.1 wt % to about 5 wt %.

The liquid vehicle may include a chelating agent. Chelating agent(s) can be used to minimize or to eliminate the deleterious effects of heavy metal impurities. Examples of suitable chelating agents can include disodium ethylenediaminetetraacetic acid (EDTA-Na), ethylene diamine tetra acetic acid (EDTA), and methyl-glycinediacetic acid (e.g., TRILON® M from BASF Corp., Germany). If included, whether a single chelating agent is used or a combination of chelating agents is used, the total amount of chelating agent(s) in the fusing agent, the detailing agent, or other fluid agent may range from 0.01 wt % to about 2 wt % or from about 0.01 wt % to about 0.5 wt %.

The liquid vehicle may also include antimicrobial agents. Antimicrobial agents can include biocides and fungicides. Example antimicrobial agents can include the NUOSEPT®, Ashland Inc. (USA), VANCIDE® (R.T. Vanderbilt Co., USA), ACTICIDE® B20 and ACTICIDE® M20 (Thor Chemicals, U.K.), PROXEL® GXL (Arch Chemicals, Inc. USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In an example, if included, the a total amount of antimicrobial agents in the fusing agent, the detailing agent, or other fluid agent can range from about 0.01 wt % to about 1 wt %.

In some examples, liquid vehicle may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5. In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added in the fusing agent, the detailing agent, or other fluid agent at an amount ranging from about 0.01 wt % to about 10 wt %, from about 0.1 wt % to about 7.5 wt %, from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "dispensing" when referring to fusing agents that may be used, for example, refers to any technology that can be used to put or place the fluid, e.g., fusing agent, on the polymeric build material or into a layer of polymeric build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters (pL), up to about 30 pL, or up to about 50 pL, etc. Example ranges may include from about 2 pL to about 50 pL, or from about 3 pL to about 12 pL.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of a Fusing Agents

Two example fusing agents (FA-1 and FA-2) and one "control" fusing agent (FA-C) were prepared by admixing the components in Table 1 together. FA-1 and FA-1 both included urea, which is a carbamide-containing compound. The "Control" fusing agent did not include a carbamide-containing compound.

TABLE 1

| | Fusing Agents | | |
|---|---|---|---|
| Component | FA-1 (wt %) | FA-2 (wt %) | FA-C (wt %) |
| Organic Co-solvent (2-Pyrrolidone, Triethylene Glycol) | 27 | 27 | 27 |
| Surfactant | 1.1 | 1.1 | 1.1 |
| Chelator | 0.08 | 0.08 | 0.08 |
| Biocide | 0.32 | 0.32 | 0.32 |
| Carbamide-containing Compound (Urea) | 4 | 8 | 0 |
| Radiation Absorber (Carbon Black Pigment) | 5 | 5 | 5 |
| DI Water | Balance | Balance | Balance |

Example 2—Preparation of Three-Dimensional Objects

Several three-dimensional printed objects were prepared in the shape of dog bones (or barbells) using two different polymeric build materials from two different manufacturers, and the three different fusing agents set forth in Table 1 of Example 1. The polymeric build materials in this evaluation were both thermoplastic polyurethane particles (TPU-1 and TPU-2). The two different thermoplastic polyurethanes had different weight average molecular weights, D50 particle sizes, and polydispersity of side-chain branching, but both can be used for polymeric build material within the ranges disclosed herein and in accordance with examples of the present disclosure.

More specifically, for the various individual combinations of fusing agent (FA-1, FA-2, or FA-C) and polymeric build material (TPU-1 or TPU-2), a total of five "Type 5" (ASTM D638) dog bones were printed using Multi-jet Fusion (MJF) printers under common printing conditions, with a printing bed temperature of about 130 C, heat fusion using a common infrared lamp turned on and off to control heating, printer speed (15 inches per second), and allowing for multiple passes per layer. The dog bone objects formed for the various combinations of materials were shaped to have an elongated middle section flanked by two enlarged end portions. After printing, all of the dog bone objects formed were sandblasted.

Example 3—Evaluation of Mechanical Properties

The dog bones prepared in accordance with Example 2 were evaluated for mechanical properties and averaged over the 5 dog bones for the various combinations of fusing agents and polymeric build materials. Specifically, the tensile strength or UTS (MPa) and the Shore hardness (Shore A, or SHA) was determined for the various combinations of materials, as provided in Table 2 below.

TABLE 2

| | Mechanical Properties | | | |
|---|---|---|---|---|
| | Mechanical Property and Polymeric Build Material ID | | | |
| Fusing | UTS | | Hardness | |
| Agent ID | TPU-1 | TPU-2 | TPU-1 | TPU-2 |
| FA-1 | 50.2 MPa | 80.1 MPa | 88.3 SHA | 94.1 SHA |
| FA-2 | 60.2 MPa | 74.3 MPa | 77.5 SHA | 82.4 SHA |
| FU-C (Control) | 52.2 MPa | 78.9 MPa | 92.3 SHA | 95.4 SHA |

With respect to Table 2 above, one desirable result would be to reduce Shore hardness, while either increasing tensile strength or without significantly impacting tensile strength. As the carbamide-containing compound can act as a softening compound, increased tensile strength, in some examples where achievable, could translate as greater elongation at break and other properties related to stretchability, while at the same time, a reduction in Shore hardness would be acceptable if the softening of the three-dimensional object was an objective of the mechanical property modification. With this in mind, as can be seen by Table 2, in this particular example, the inclusion of the carbamide-containing compound (urea) at 4 wt % (FA-1) provided a slight tensile strength increase with TPU-2 and a slight tensile strength decrease with TPU-1, indicating a nominal change in tensile strength. However, with respect to Shore hardness, FA-1 was found to be slightly softer when combined with both TPU-1 and TPU-2. Thus, even at 4 wt %, there was a slight reduction in Shore hardness with nominal modification of tensile strength. When the concentration of urea in the fusing agent was brought above 4 wt % to 8 wt % (FA-2), the reduction in harness was significantly modified to provide a softer three-dimensional object, and with TPU-1 the tensile strength was considerably enhanced. Regarding FA-2 and TPU-2, a reduction in tensile strength was minimal compared to the significantly modified Shore hardness (or enhanced softness) provided by that same combination.

What is claimed is:
1. A three-dimensional printing kit, comprising:
  a polymeric build material including polymer particles having a D50 particle size of from about 2 μm to about 150 μm; and a fusing agent comprising:
  an aqueous liquid vehicle including water and an organic co-solvent;
  a radiation absorber to generate heat from absorbed electromagnetic radiation; and
  a carbamide-containing compound present in an amount from about 2 wt % to about 15 wt %, based on a total weight of the fusing agent.

2. The three-dimensional printing kit of claim 1, wherein the carbamide-containing compound includes urea or a bi-urea and is present in the fusing agent in an amount from about 4 wt % to about 12 wt %, based on the total weight of the fusing agent.

3. The three-dimensional printing kit of claim 1, wherein the radiation absorber includes carbon black, a metal dithiolene complex, a near-infrared absorbing dye, a near-infrared absorbing pigment, metal nanoparticles, a conjugated polymer, or a combination thereof.

4. The three-dimensional printing kit of claim 1, wherein the radiation absorber is present in the fusing agent in an amount from about 0.1 wt % to about 10 wt %, based on the total weight of the fusing agent.

5. The three-dimensional printing kit of claim 1, wherein the aqueous liquid vehicle further includes a surfactant present in an amount from about 0.01 wt % to about 2 wt %, based on the total weight of the fusing agent.

6. The three-dimensional printing kit of claim 1, wherein the polymeric build material includes polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or a copolymer thereof.

7. The three-dimensional printing kit of claim 1, wherein the radiation absorber is carbon black and the polymer particles include a thermoplastic polyurethane or a thermoplastic polyamide.

8. The three-dimensional printing kit of claim 1, further comprising a detailing agent including a detailing compound to reduce a temperature of the polymeric build material onto which the detailing agent is applied.

9. The three-dimensional printing kit of claim 1, wherein the polymeric build material is a thermoplastic polyamide.

10. The three-dimensional printing kit of claim 1, wherein the polymeric build material is a thermoplastic polyurethane and the carbamide-containing compound has Formula I:

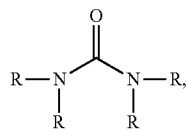

wherein R is independently $NHC(O)NH_2$, $C(O)NH_2$, or an alkyl having from 1 to 4 carbon atoms.

11. The three-dimensional printing kit of claim 1, wherein the carbamide-containing compound is urea, and wherein the urea is present in an amount from about 4 wt % to about 8 wt %, based on the total weight of the fusing agent.

12. The three-dimensional printing kit of claim 1, wherein the radiation absorber is carbon black, the carbamide-containing compound is urea, and the organic co-solvent includes 2-pyrrolidone and triethylene glycol, and wherein the fusing agent includes:

from about 5 wt % to about 7.5 wt % of the carbon black;
from about 4 wt % to about 8 wt % of the urea;
from about 10 wt % to about 50 wt % of the organic co-solvent;
from about 0.01 wt % to about 2 wt % of a surfactant; and
the balance being water,
wherein all of the amounts are based on the total weight of the fusing agent.

13. A method of printing three-dimensional object, the method comprising:
  iteratively applying individual polymeric build material layers including polymer particles having a D50 particle size of from about 2 μm to about 150 μm;
  based on a three-dimensional object model, iteratively and selectively dispensing a fusing agent onto the individual build material layers, wherein the fusing agent comprises:
    an aqueous liquid vehicle including water and an organic co-solvent;
    a radiation absorber to generate heat from absorbed electromagnetic radiation; and
    a carbamide-containing compound present in an amount from about 2 wt % to about 15 wt %, based on a total weight of the fusing agent; and
  iteratively exposing the individual polymeric build material layers with the fusing agent dispensed thereon to the electromagnetic radiation to selectively fuse the polymer particles of the polymeric build material in contact with the radiation absorber and to form a fused three-dimensional object.

14. The method of claim 13, wherein the radiation absorber is carbon black and the polymer particles include a thermoplastic polyurethane or a thermoplastic polyamide.

15. The method of claim 13, wherein the carbamide-containing compound includes urea or a bi-urea and is applied to the individual polymeric build material layers at a carbamide-containing compound-to-polymer particles weight ratio of from about 1:50 to about 1:500.

16. The method of claim 13, further comprising selectively jetting a detailing agent comprising a detailing compound onto the individual polymeric build material layers to reduce a temperature of the individual polymeric build material layers onto which the detailing agent is applied.

17. A three-dimensional printing system, comprising:
  a polymeric build material including polymer particles having a D50 particle size of from about 2 μm to about 150 μm; and
  a fluid applicator fluidly coupled or coupleable to a fusing agent, wherein the fluid applicator is directable to iteratively apply the fusing agent to layers of the polymeric build material, the fusing agent comprising:
    an aqueous liquid vehicle including water and an organic co-solvent;
    a radiation absorber to generate heat from absorbed electromagnetic radiation; and
    a carbamide-containing compound present in an amount from about 2 wt % to about 15 wt %, based on a total weight of the fusing agent.

18. The three-dimensional printing system of claim 17, further comprising an electromagnetic radiation source positioned to provide the electromagnetic radiation to the layers of the polymeric build material having the fusing agent applied thereto.

19. The three-dimensional printing system of claim 18, wherein the radiation absorber selectively absorbs infrared energy and wherein the electromagnetic radiation source is an infrared electromagnetic radiation source that emits a peak wavelength that corresponds with the infrared energy.

* * * * *